May 22, 1962

W. B. ZELINA 3,036,241

VOLTAGE DETECTION NETWORK

Filed Nov. 23, 1956

Inventor:
William B. Zelina,
by David P. Ogden
His Attorney.

United States Patent Office 3,036,241
Patented May 22, 1962

3,036,241
VOLTAGE DETECTION NETWORK
William B. Zelina, Erie, Pa., assignor to General Electric Company, a corporation of New York
Filed Nov. 23, 1956, Ser. No. 623,891
11 Claims. (Cl. 317—5)

This invention relates to voltage detection networks and more particularly to an automatic transition system which will give a true indication of the speed of a locomotive.

A rugged, accurate and reliable voltage detection network has been sought by industry for many years. Such a device is particularly adapted for use on a locomotive. Because of the wide speed range encountered by locomotive dynamoelectric traction motors, it is economically expedient that traction motor connection switching arrangements and field shunting be employed at various locomotive speeds. Often, a series full field connection can be employed for initially starting the locomotive. At a first speed, field shunting is employed to reduce the back voltage of the traction motors to maintain torque. At a second speed, the traction motors are switched from shunted series connection to full field parallel connection. At still a third speed, field shunting may be again employed. The speeds at which these switching arrangements are required are generally referred to as transition points. A speed limit is often necessary whereby a transition at a maximum speed is accomplished to effect overspeed protection of equipment. The proper speed of these transitions, particularly of the overspeed protection, to be most effective should be automatically and positively determined.

In the past, one practice of the industry has been to apply a voltage versus speed characteristic to a calibrated relay and depend on the energization voltage of the relay to remain accurately calibrated to insure all operations at essentially the same speed. In these systems, a three percent variation of pick-up voltage of a calibrated relay is reflected as a three percent error in the transition speed. Errors greater than this often occur with resulting inefficiency or danger, particularly in overspeed protection. Such errors either unnecessarily limit the speed or acceleration of the locomotive or allow the locomotive or the traction motors to run at excessive speeds which are both dangerous and likely to damage the equipment.

Therefore, an object of my invention is to provide a simple and reliable network for detecting an electric signal.

A further object is to provide a simple, reliable transition signal which will remain calibrated for a long period of time.

Briefly, in accordance with my invention, a variable or unknown electric signal is compared to a predetermined constant voltage signal from a source independent of battery voltage variations. Any differential signal is amplified to actuate a control device such as a relay to initiate a signal or a desired transition step.

The subject matter which I regard as my invention is particularly pointed out and distinctly claimed in the concluding portion of this specification. My invention, however, both as to its organization and method of operation, together with further objects and advantages thereof, will best be understood by reference to the following descriptions taken in connection with the accompanying drawing, in which:

Figure 1:
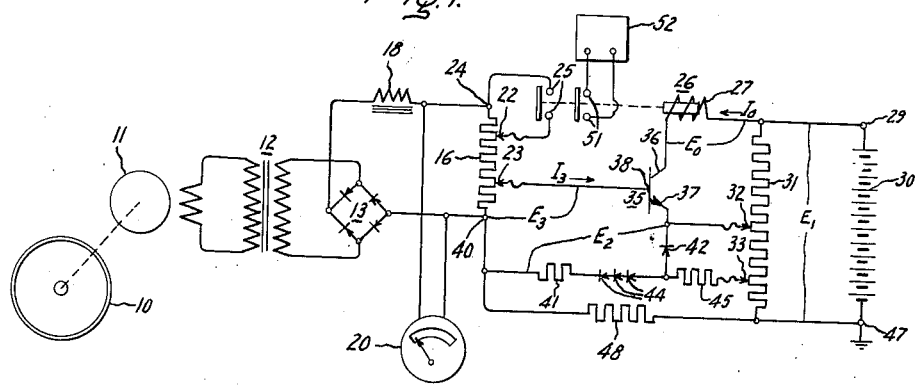
FIG. 1 is a schematic circuit showing one embodiment of my invention.

Referring now to the drawing, in FIG. 1, I have shown one form of my invention as applied in a simplified transition circuit for a locomotive. As a locomotive wheel 10 rolls, it drives a speed measuring device such as an alternator 11 which has its output terminals connected to a saturable transformer 12. The transformer 12 is saturated by each half cycle output of the alternator 11 so that the half cycle output of the transformer 12 is relatively constant. Thus, its average output depends only on the number of half cycles or, in other words, on the speed of the wheel 10.

As the speed of the wheel 10 increases, the voltage output of the transformer 12 increases to increase the unidirectional current output of a bridge rectifier 13. An increase in the output of the rectifier 13 will raise the voltage output across a voltage divider 16. I prefer to use a smoothing reactor 18 to reduce any fluctuations of the current characteristic across the resistor 16 and also to reduce fluctuating currents in a speedometer device 20 which is a measuring device connected to sense the output of the alternator 11.

Figure 3:
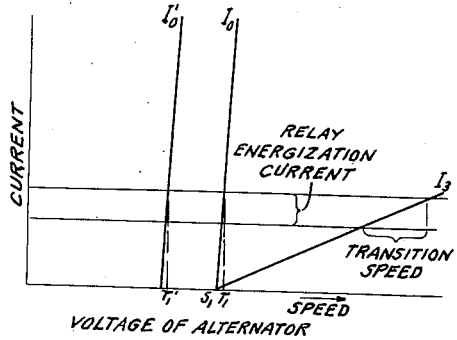
FIG. 3 is a curve illustrating a method of amplifying the differential signal to eliminate inherent inaccuracies.

The voltage divider 16 is provided with a plurality of voltage taps 22 and 23. The portion of the divider 16 between the voltage taps 22 and the terminal 24 may be shunted by normally open contacts 25 of a relay 26. I prefer to have this portion of resistance shunted from the circuit during transition so that the acceleration transition speed $T_1'$ is above the deceleration transition speed $t_1'$ (FIG. 3). This arrangement will prevent hunting of the transition equipment which might otherwise be caused by the fact that power is usually removed from the traction motors during transition and the vehicle will usually decelerate slightly which would result in a lower voltage across terminals 24 and 40, and hence a lower potential at tap 23. With the accuracy of my detection system, a very slight decrease in speed would cause the voltage at the tap 23 to decrease sufficiently to prevent completion of the transition.

According to my invention, I provide a network for accurately and reliably detecting a voltage such as that across voltage divider 16. The remaining portion of the circuit of FIG. 1 provides a constant voltage signal $E_2$ which is adapted to be compared with the variable voltage $E_3$ across a portion of the voltage divider 16. In this portion of the network, an actuating coil 27 of the relay 26 is connected in circuit with a positive terminal 29 of a source of relatively constant voltage $E_1$ such as a battery 30, a voltage divider 31 having voltage taps 32 and 33 and a transistor 35 provided with a collector electrode 36, an emitter electrode 37 and a base electrode 38. The series circuit of the coil 27 and the transistor 35 will not carry current until there is a potential between the base electrode 38 and the emitter electrode 37 which removes the the barrier layer to enhance a current flow from the terminal 29 to the voltage tap 32. When the variable voltage $E_3$ is greater than the constant voltage $E_2$, the relay 26 is energized.

In order to control this transistor current flow, the base electrode 38 is connected to the voltage tap 23 of the voltage divider 16. Another terminal 40 of the voltage divider 16 is connected through a resistor 41, a silicon diode 42 operated in the Zener region and temperature compensating means such as the rectifiers 44 to the emitter electrode 37. The emitter electrode also is connected to the voltage tap 32. A resistor 45 is connected between the other terminal of the Zener diode 42 and the voltage tap 33. The negative terminal 47 of the battery 30 is connected through a resistor 48 to the terminal 40 of the load resistor 16.

Figure 2:
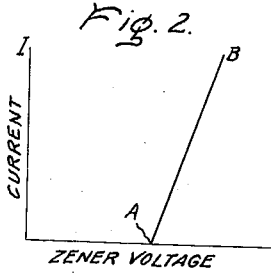
FIG. 2 is a curve showing the characteristics of the Zener diode used in my invention.

In order to explain fully the diode rectifier 42 operated in the Zener region, I have shown in FIG. 2, with current on the axis of the ordinates and voltage on the axis of the abscissa, the characteristic curve of the diode 42. The voltage at the voltage tap 32 is positive with respect to the voltage at the voltage tap 33. Thus, the Zener diode will carry current only in the reverse direction. By reverse direction, I mean the direction of maximum impedance. With the connection I have shown, I contemplate operating the Zener diode 42 in such a manner that it will become conductive in a reverse direction at some fixed potential such as 5 volts.

In order to maintain a minimum current in the Zener diode 42, the voltage taps 32 and 33 are spaced apart on the voltage divider 31 to provide a voltage slightly greater than 5 volts across the diode 42. The resistor 45 is chosen to have an impedance great enough to limit the current flow in the loop circuit including the taps 32 and 33 and the Zener diode 42 to a current of approximately .0005 ampere. I prefer to maintain this current to remove any "noise" within the Zener diode 42. This noise would tend to occur at very low current levels and might adversely affect the operation of the Zener diode.

As shown in FIG. 2, the Zener diode is operated in a reverse current direction. It will not carry any appreciable current until it breaks down in the reverse direction at voltage A. After this breakdown, its impedance its very low so that the resistors 41, 45 and 48 control the slope of the impedance line AB.

In order to eliminate voltage variation with temperature variation of the Zener diode 42, the compensating rectifiers 44 are connected in circuit in a sense which will increase the voltage $E_2$ when temperature variation tends to decrease the impedance of the Zener diode 42. With the Zener diode 42 connected in circuit to determine a constant voltage $E_2$ between the emitter electrode 37 of the transistor 35 and the terminal 40 of the voltage divider 16, it is apparent that no current will flow between the base electrode and the emitter electrode 37 to enhance conductance in the transistor 35 until the voltage $E_3$ between the voltage tap 23 and the terminal 40 is greater than the constant voltage $E_2$ across the Zener diode 42, compensating diodes 44 and resistor 41.

This current is clearly shown as $I_3$ in FIG. 3. The current $I_3$ starts to flow when $E_3$ equals $E_2$ at speed $S_1$. However, with the addition of the transistor 35 the current $I_0$ through the relay coil 27 is amplified to have a much greater slope than the current $I_3$. In previous systems, the change in the current $I_3$ has energized a very sensitive relay to initiate transition steps. However, the energization current of the relay 26 usually varies so much that it becomes impractical to determine the speed of transition within one percent. The "relay energization current" variation shown in FIG. 3 will cause a considerable transition speed variation if $I_3$ were to directly energize the relay 26. The current $I_0$ has a greater slope and variation of the "relay energization current" will not materially affect the speed of transition $T_1$. Since the location of the voltage tap 23 may be adjusted, it is apparent that the point of transition is adjustable and another desired speed $S_2$ (FIG. 4) of the wheel 10 may cause transition voltage $E_3'$ to enhance conductance in the transistor 35 to energize the relay 26.

The additional voltage necessary to enhance conductance through the transistor 35 once the voltage tap 23 has a voltage greater than that across the Zener diode 42 is very small as is indicated by the slope of the current $I_0$, being on the order of a fraction of a volt. The voltage $E_2$ across the Zener diode 42 is many times larger than this fraction, being on the order of 5 volts. It is apparent that once the voltage $E_3$ between the terminal 40 and the tap 23 is equal to the voltage across the diode 42, $S_1$ of FIG. 4, a change of less than a volt across the voltage divider 16 will energize the coil 27 of the relay 26 to shunt contacts 51 and the contacts 25. Contacts 51 are connected in circuit to energize whatever portion of the control equipment 52 is necessary to provide the transition desired. As mentioned above, one useful sensing device might be an indication lamp showing that the detected voltage across the voltage divider 16 is at a desirable value.

With my invention, the only critical fixed voltage in this system is the voltage $E_2$. This voltage $E_2$ depends primarily on the voltage across the Zener diode 42 and the temperature compensating diodes 44. However, voltage $E_1$ across the battery may vary as much as forty percent (FIG. 4) without appreciably changing the setting at which the relay will be energized. The resistor 41 compensates for such changes in battery voltage. The resistor 41 is adapted to increase the voltage $E_2$ very slightly to $E_2'$ with increases in the voltage $E_1$ to $E_1'$.

Figure 4:
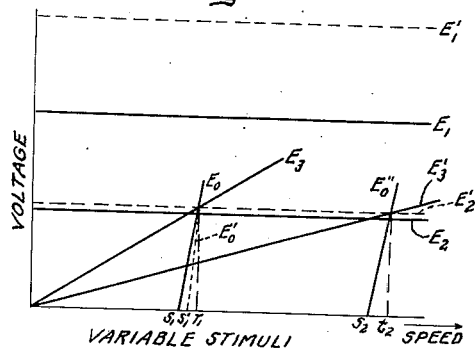
FIG. 4 is a curve showing the voltages of interest compared to a variable battery voltage signal.

Thus, when the battery voltage changes from $E_1$ to $E_1'$, $E_2$ will increase to $E_2'$ and change the speed at which the transistor 35 starts to conduct from $S_1$ to $S_1'$. This change compensates for the slightly increased slope of the current $I_0$ in the relay 26 because of the increase in $E_1$. Obviously, an increase in $E_1$ to $E_1'$ will increase the voltage $E_0$ across the relay 26 so that its slope will now be $E_0'$ (FIG. 4). Thus, the speed setting of the transition $T_1$ is not affected by major changes in battery voltage $E_1$; nor does it depend on the precise setting of the terminals 32 and 33, nor is the energization current of the relay 26 particularly critical. A variation of as much as fifty percent in the "relay energization current" (FIG. 3) of the relay 26 will not change the transition speed $t_1$ at which the relay energizes by more than a fraction of a percent, with the transistor 35 connected to amplify the current $I_3$ by one hundred or more. Without this amplification, it is obvious that a slight change in the "relay energization current" would cause a discernable change in the "transition speed" (FIG. 3).

Thus, I have described a voltage detection system suitable for transition control which is inherently accurate and since the critical constant voltage is across the Zener diode 42, it will not deteriorate with time.

While I have shown and described particular embodiments of my invention, other modifications will occur to those skilled in the art. For instance, the transistor 35 may be replaced with another amplifying device which is sensitive to a very small current or voltage to become conductive. Also, the battery 30 may be replaced by any voltage source that is relatively constant. I intend by the appended claims to cover these and such other modifications as occur to those skilled in the art which fall within the true spirit and scope of my invention.

What I claim as new and desire to secure by Letters Patent of the United States is:

1. An automatic transition network comprising, electric equipment including a dynamoelectric machine driveably connected to a rotatable shaft for providing a unidirectional electric signal having a magnitude proportional to the speed of rotation of said shaft; a voltage divider connected to said machine for carrying unidirectional current proportional to said signal, a voltage tap on said voltage divider; a Zener diode operable in the reverse current direction and connected to a separate source of voltage, said voltage being adapted to cause a reverse current flow therein to maintain a predetermined unidirectional voltage thereacross; a contact connected in circuit with transition control means, a relay for operating said contact; a transistor having its emitter and collector electrodes connected in circuit with said relay for controlling current flow therethrough; electric circuit means connecting one terminal of said voltage divider and one terminal of said diode, other electric circuit means connecting the base electrode and another electrode of said transistor between said tap and the other terminal of said diode in a sense enhancing current flow through said relay when a preselected portion of the voltage across said divider becomes greater than said predetermined voltage to initiate transitional operations at a preselected speed of the shaft.

2. A network for detecting a voltage of a variable voltage source only when a predetermined voltage has been obtained thereat comprising, a constant voltage device connected in circuit with a separate voltage source; electric circuit means for connecting the device to the variable voltage source for comparing a predetermined portion of the variable voltage to the voltage across the constant voltage device; a switching device connected in circuit with the constant voltage device and variable voltage source and arranged to be conductive only when said selected variable voltage portion is greater than the voltage across the constant voltage device, said switching device being connected in circuit with the separate voltage source; and sensing means adapted to be energized when the switching device is conductive.

3. An automatic transition network comprising, an alternator adapted to be connected to a rotatable shaft for providing a signal having a frequency proportional to the speed of rotation of the shaft; means for deriving a unidirectional signal proportional in magnitude to the frequency of the output signal of said alternator; a voltage divider connected across said unidirectional signal deriving means, a voltage tap on said voltage divider; a Zener diode adapted to be connected in a reverse current direction to a source of voltage, the voltage source being adapted to cause a reverse current flow in said Zener diode to maintain a predetermined voltage thereacross, electric current means for limiting the reverse current; transition control means, a contact connected in circuit in said transition control means, a relay having a coil arranged to operate said contact; a transistor having emitter, collector and base electrodes, said emitter and collector electrodes connected in series with said relay and the voltage source; electric circuit means connecting one terminal of said voltage divider and one terminal of said Zener diode; other electric circuit means serially connecting the base electrode and another electrode of said transistor between said tap and the other terminal of said Zener diode, whereby the barrier layer within said transistor is removed to enhance current flow through said coil when the voltage at said tap becomes greater than the voltage across said Zener diode to initiate transitional operations at a preselected speed of said shaft.

4. A frequency-sensitive device comprising, an alternator having a variable frequency output signal dependent on its driven speed; a saturable core transformer adapted to be saturated by the output of said alternator; means for applying the output of said alternator to said transformer; means for rectifying the output of said transformer thereby providing a unidirectional voltage proportional to the number of half cycles of the output signal of said alternator; a constant voltage device adapted to be energized from a source of votlage to provide a constant voltage thereacross; electric circuit means for comparing the voltage across said constant voltage device with the proportional unidirectional signal comprising, a switching device conductive only when said proportional signal is greater than the voltage across the constant voltage device and sensing means in circuit with said switching device adapted to be energized in response to current flow in said switching device at a predetermined speed of said alternator.

5. A network for sensing the speed of rotation of a shaft above a predetermined speed comprising, means for deriving a unidirectional voltage having a magnitude proportional to the speed of rotation of said shaft; circuit means for applying said unidirectional voltage across a voltage divider; an amplifying device having a control electrode and two other electrodes; a first circuit including, a current-sensing device connected in circuit with said two other electrodes, said circuit being connectable to a source of direct current; a second circuit comprising, a diode connected to one of said other electrodes, said diode being poled in its reverse current direction and having a resistance in series therewith to limit current through said diode upon breakdown of said diode; said second circuit adapted to be connected to a source of direct current so that the voltage applied thereto is sufficient to cause breakdown of said reversely poled diode and current conduction therethrough provides a constant reference potential bias on said one of said other electrode which renders said amplifying device inoperative; and circuit means connecting said control electrode to a tap on said voltage divider; said tap being positioned on said voltage divider so that when the voltage across said divider exceeds a predetermined magnitude in response to speed of said shaft, the voltage at said control electrode overcomes the reference bias on said one of said other electrodes to render said amplifying device operative and cause said first circuit to carry current and actuate said sensing device.

6. The network of claim 5 wherein actuation of said sensing means is effective to shunt a portion of said voltage divider to thereby increase the potential at said tap.

7. The network of claim 5 wherein said means for deriving a unidirectional voltage comprises an alternator having an output signal frequency proportional to its driven speed, a saturable core transformer adapted to be saturated by the output of said alternator and means for rectifying the output of said transformer.

8. The network of claim 5 including second resistance means, said second circuit being connected across a predetermined portion of said second resistance means so that application of a direct current voltage across said second resistance means causes breakdown of said diode and current flow therethrough in the reverse direction which produces a constant reference potential at said one of said other electrodes.

9. The network of claim 5 wherein said amplifying device is a transistor, said control electrode is the transistor base electrode and said one of said other electrodes is the transistor emitter electrode.

10. The device of claim 4 wherein said switching device is an amplifying device having a control electrode and said proportional signal is applied to said control electrode.

11. The network of claim 2 wherein said switching device is an amplifying device having a control electrode and said predetermined portion of the variable voltage is applied to said control electrode.

References Cited in the file of this patent

UNITED STATES PATENTS

| | | |
|---|---|---|
| 2,500,548 | Keller | Mar. 14, 1950 |
| 2,655,608 | Valdes | Oct. 13, 1953 |
| 2,714,702 | Shockley | Aug. 2, 1955 |
| 2,751,550 | Chase | June 19, 1956 |
| 2,791,739 | Light | May 7, 1957 |
| 2,803,815 | Wulfsberg | Aug. 20, 1957 |
| 2,816,262 | Elliott | Dec. 10, 1957 |

OTHER REFERENCES

"Transistor Control Relay," Edwin Bohr, Radio Electronics, vol. XXIV, No. 7, July 1953, pages 51 to 54.

UNITED STATES PATENT OFFICE

CERTIFICATE OF CORRECTION

Patent No. 3,036,241                                May 22, 1962

William B. Zelina

It is hereby certified that error appears in the above numbered patent requiring correction and that the said Letters Patent should read as corrected below.

Column 5, line 33, for "current" read -- circuit --; column 6, line 19, for "divider;" read -- divider, --.

Signed and sealed this 11th day of September 1962.

(SEAL)
Attest:

ERNEST W. SWIDER
Attesting Officer

DAVID L. LADD
Commissioner of Patents